Figures 1, 2:
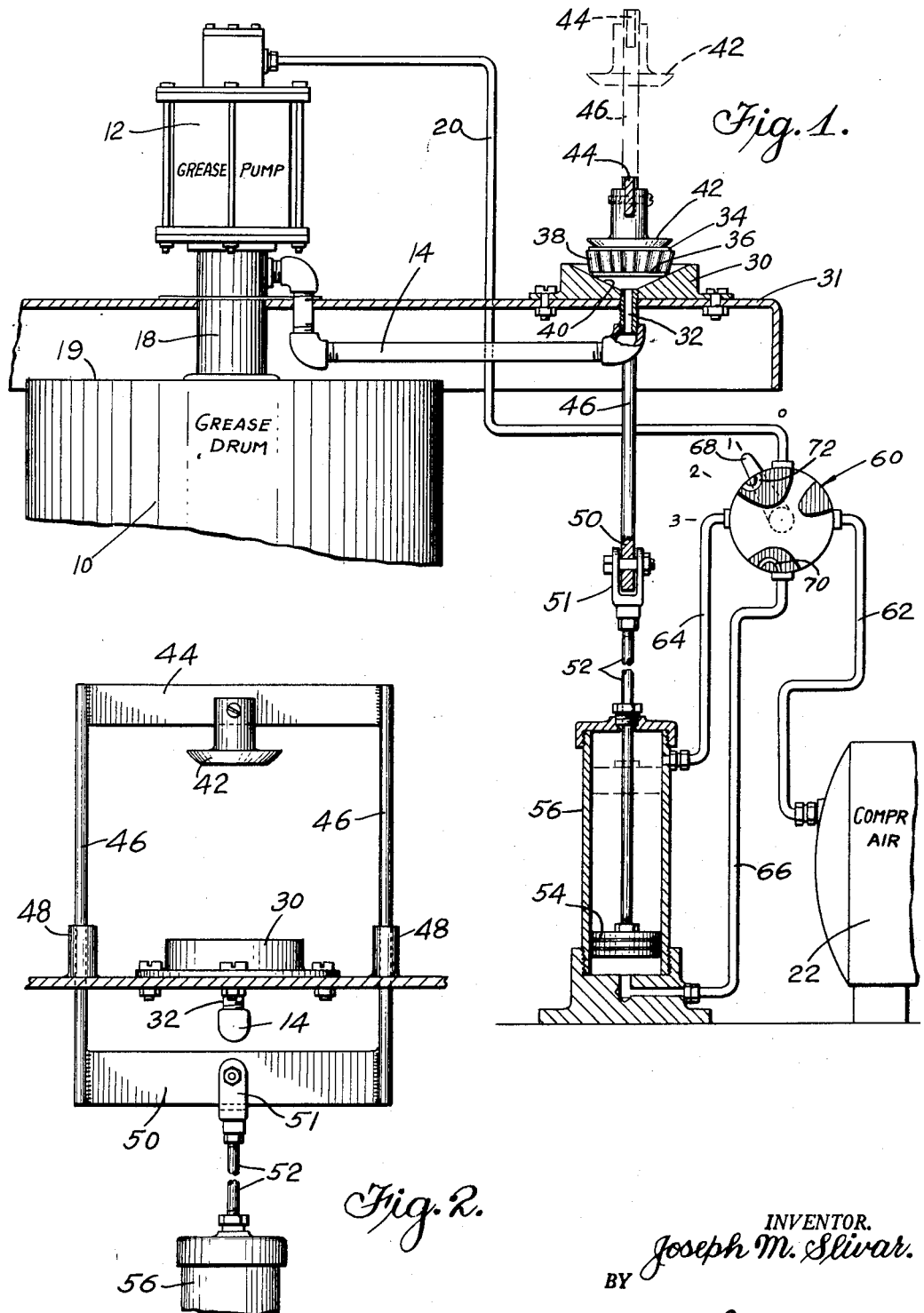

Feb. 28, 1956 — J. M. SLIVAR — 2,736,392
APPARATUS FOR PACKING BEARINGS
Filed June 23, 1953

INVENTOR.
Joseph M. Slivar.
BY
A R McAndy
ATTORNEYS.

United States Patent Office 2,736,392
Patented Feb. 28, 1956

2,736,392
APPARATUS FOR PACKING BEARINGS
Joseph M. Slivar, Ventura, Calif.
Application June 23, 1953, Serial No. 363,701
1 Claim. (Cl. 184—1)
(Granted under Title 35, U. S. Code (1952), sec. 266)

The invention described herein may be manufactured and used by or for the Government of the United States of America for governmental purposes without the payment of any royalties thereon or therefor.

This invention relates to a device for packing grease in roller bearings and the like.

In the maintenance of automotive vehicles and other machines having removable anti-friction bearings, it is customary to periodically remove the bearings, clean them, pack them with grease, and replace them in the machine. Proper packing of the bearing requires that the grease be forced into the bearing under such pressure as to completely fill the bearing assembly, yet without wasting grease. It is also desirable that the placing of the bearing in the apparatus, the injection of grease therein, and the removal of the greased bearing, be accomplished with minimum expenditure of time and effort.

The device of the present invention accomplishes these results by utilizing the compressed air commonly available at the site of the packing operation, first to clamp the bearing in place, second to force the grease thereinto, and third to release the bearing. By the utilization of simplified control means hereinafter described, the time and effort required to pack a series of bearings is reduced to a minimum.

An object of the invention is to provide an improved bearing-packing device having the advantages above indicated.

Other objects and many of the attendant advantages of this invention will be readily appreciated as the same becomes better understood by reference to the following description.

Fig. 1 is a diagrammatic view of apparatus embodying the invention, the bearing-retaining means being shown in cross-section; and Fig. 2 is an enlarged end view of the bearing-retaining means.

The apparatus shown in the drawing comprises a container 10 for grease which is provided with any suitable apparatus, as a grease pump 12, for pumping grease from the container to a pressure conduit 14. As shown, the container 10 is in the form of a cylindrical drum having an outlet member 18 therein. The member 18 may be mounted in the head 19 of the drum, as shown, and the pump 12 may be mounted on an extension of the member 18; however, any known means may be employed for supplying grease under pressure to the conduit 14. The apparatus is preferably actuated by compressed air supplied through a conduit 20 from a source 22 such as is commonly available at service stations and similar establishments.

The clamping means for the bearing comprises a stationary bearing seat 30 mounted on a support 31 and having an inlet opening 32 through which grease from conduit 14 may pass to the bearing which, as shown, is of the roller type including a race ring 34 and a spacing ring 36 which retains the tapered rollers 38. The bearing is seated upon the conical surface 40 of seat 30, and may be held in place by a retaining member 42 which has a frusto-conical surface designed to partially enter the ring 34 and thus center the bearing, while preventing the passage of excess grease through the hollow center of the bearing.

The retaining member 42 is fixed to a crosshead 44 which is carried by two vertical rods 46 slidable in guide members 48 on support 31. At their lower ends, rods 46 are secured to a second crosshead 50 to which is secured, as by a clevis 51, the rod 52 of a piston 54 reciprocable in a stationary cylinder 56. It will be seen that downward movement of the piston 54 will move member 42 downwardly to retain the bearing in place on the seat 30, while upward movement thereof will move member 42 to the dotted line position shown in Fig. 1, thereby releasing the bearing.

A three-way valve 60 is provided to selectively cause flow of compressed air from source 22 and conduit 62 to the various elements as will now be described. In the first position, indicated at 1 in the drawing, the manual control lever 68 is in the position shown, and compressed air flows from the valve through conduit 64 to the upper face of the piston to thereby move member 42 downwardly into contact with the bearing. During this operation conduit 66 is vented through vent 70 in the valve.

In the second position, indicated at 2 in the drawing, compressed air will flow through conduit 20 to pump 12, to cause grease to be forced through conduit 14 while still maintaining the pressure on the upper face of piston 54, conduit 66 being still vented through vent 70.

In the third position, indicated at 3 in the drawing, compressed air will flow through a conduit 66 to the lower face of the piston to cause member 42 to release the bearing while at the same time, by means of vent 72, releasing the pressure on the upper face of the piston and, by occluding conduit 20, cutting off the supply of air to pump 12.

In the operation of the device, the operator will move lever 68 to position 3, which will cause member 42 to be moved to its upper position. He will then place a bearing in the seat 30 and move lever 68 to position 1, which will lower member 42 and clamp the bearing to its seat; and thence to position 2, which will force grease thereinto while still maintaining it clamped in place. When the bearing has been lubricated, he will move the lever 68 back to position 3, remove the lubricated bearing, insert an unlubricated bearing, and repeat the process.

Obviously many modifications and variations of the present invention are possible in the light of the above teachings. It is therefore to be understood that within the scope of the appended claim the invention may be practiced otherwise than as specifically described.

What is claimed is:

A pressure lubricating device for roller bearings, comprising a container for grease, clamping means having a fixed and a movable member for retaining a bearing in position for being lubricated, a conduit of considerable length leading from said container and communicating with a bearing in said clamping means, a pump in said conduit operative to supply grease under pressure through said conduit, air pressure means for actuating said pump and said clamping means, and a valve operative in three successive positions to cause said air pressure means to actuate said clamping means, to energize said pump, and to retract said clamping means.

References Cited in the file of this patent

UNITED STATES PATENTS

| | | |
|---|---|---|
| 2,328,812 | Klein | Sept. 7, 1943 |
| 2,438,122 | Krobath | Mar. 23, 1948 |
| 2,615,532 | Drury | Oct. 28, 1952 |
| 2,679,301 | Maddux | May 23, 1954 |

FOREIGN PATENTS

| | | |
|---|---|---|
| 906,794 | France | May 28, 1945 |